(12) United States Patent
Kamiji et al.

(10) Patent No.: US 10,449,704 B2
(45) Date of Patent: Oct. 22, 2019

(54) MANUFACTURING METHOD OF INSERT MOLDED ARTICLE

(71) Applicant: NAKANISHI METAL WORKS CO., LTD., Osaka-shi (JP)

(72) Inventors: Michiyuki Kamiji, Osaka (JP); Yoshihiro Ito, Osaka (JP); Nobumasa Oka, Osaka (JP)

(73) Assignee: NAKANISHI METAL WORKS CO., LTD., Osaka-shi (JP)

(*) Notice: Subject to any disclaimer, the term of this patent is extended or adjusted under 35 U.S.C. 154(b) by 568 days.

(21) Appl. No.: 15/154,056

(22) Filed: May 13, 2016

(65) Prior Publication Data

US 2016/0346975 A1     Dec. 1, 2016

(30) Foreign Application Priority Data

May 27, 2015   (JP) .................................. 2015-107578
Mar. 17, 2016   (JP) .................................. 2016-053314

(51) Int. Cl.
*B29C 45/14*     (2006.01)
*B29C 45/27*     (2006.01)
(Continued)

(52) U.S. Cl.
CPC .... *B29C 45/14819* (2013.01); *B29C 45/0025* (2013.01); *B29C 45/0046* (2013.01);
(Continued)

(58) Field of Classification Search
None
See application file for complete search history.

(56) References Cited

U.S. PATENT DOCUMENTS

| 3,668,034 | A  | * | 6/1972 | Nicholas | ........... B29C 45/14311 264/241 |
| 7,592,798 | B2 | * | 9/2009 | Yabe | ..................... F16C 19/186 324/174 |
| 2005/0046081 | A1 | * | 3/2005 | Hara | ................ B29C 45/14639 264/275 |

FOREIGN PATENT DOCUMENTS

| JP | H06-182808 | 7/1994 |
| JP | 4189696 B | 12/2008 |
| JP | 4432764 B | 3/2010 |

* cited by examiner

*Primary Examiner* — Edmund H Lee
(74) *Attorney, Agent, or Firm* — Kratz, Quintos & Hanson, LLP

(57) ABSTRACT

The present invention is intended to provide an injection molding die that improves the strength of adhesion between an insert and a plastic in an insert molded article while suppressing fluctuations in the strength of adhesion.

An injection molding die is used to manufacture an insert molded article by placing an insert 12 with a thermoset resin adhesive in the molding die and injecting a molten plastic material P from a gate G into a cavity C. The gate G is arranged at a position separated by 0.2 mm or more in an out-of-plane direction from a surface A1 of the adhesive applied to the joining surface of the insert 12. During injection molding, the wall surface shear stress generated on the adhesive applied to the joining surface of the insert 12 relative to the plastic near the gate G becomes small. The adhesive is not swept away by the high-pressure molten plastic material P without having to bring the adhesive applied to the joining surface A of the insert 12 into the semi-cured state. Accordingly, it is possible to conduct injection molding without bringing the adhesive into the semi-cured state.

4 Claims, 13 Drawing Sheets

(51) Int. Cl.
*B29C 45/00* (2006.01)
*F16C 41/00* (2006.01)
B29K 101/10 (2006.01)
B29K 705/00 (2006.01)
B29L 31/32 (2006.01)

(52) U.S. Cl.
CPC .... *B29C 45/1459* (2013.01); *B29C 45/14311* (2013.01); *B29C 45/2708* (2013.01); *F16C 41/007* (2013.01); *B29C 2045/0027* (2013.01); *B29K 2101/10* (2013.01); *B29K 2705/00* (2013.01); *B29K 2995/0008* (2013.01); *B29L 2031/32* (2013.01)

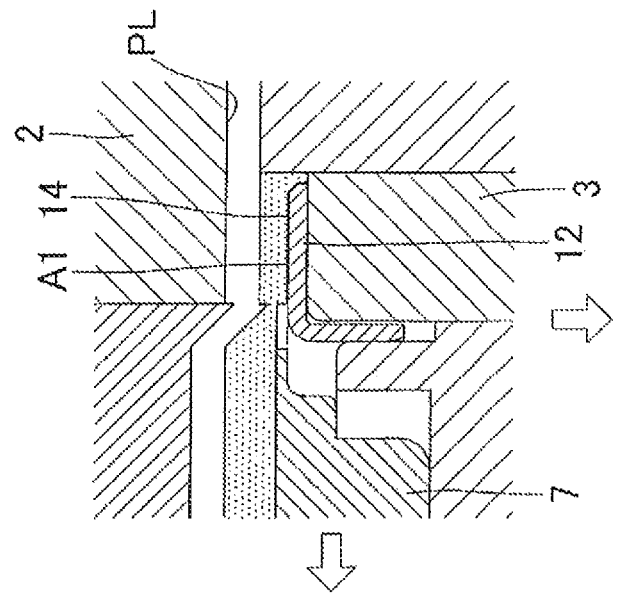
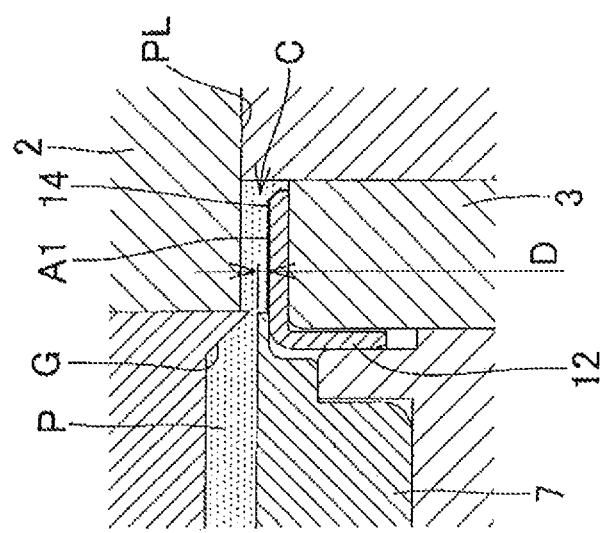

MANUFACTURING METHOD OF INSERT MOLDED ARTICLE

TECHNICAL FIELD

The present invention relates to an injection molding die for performing injection molding while an insert with a thermoset resin adhesive applied to a joining surface relative to plastic is placed in the mold, and a manufacturing method of an insert molded article using the molding die.

BACKGROUND ART

According to a manufacturing method of an insert molded article by placing in a molding die a metallic part as an insert with a thermoset resin adhesive applied to a joining surface relative to plastic and injecting a molten plastic material from a gate into the molding die, when the injection molding is performed with the adhesive in an uncured state, the adhesive is swept away by the molten plastic material injected into the molding die, thereby reducing the strength of adhesion between the metallic part and the plastic (for example, refer to Patent Document 1, paragraph [0010]).

In addition, when the injection molding is performed with the adhesive in a fully cured state, the adhesive and the plastic do not conform well to each other to reduce the strength of adhesion between the metallic part and the plastic (for example, refer to Patent Document 1, paragraph [0010]).

To solve the foregoing problems and improve the strength of adhesion between the metallic part and the plastic, there has been proposed a method for performing injection molding with the adhesive in a semi-cured state (for example, Patent Document 1, claim 1, and paragraphs [0008] and [0011]).

Such a technique of performing injection molding after bringing a thermoset resin adhesive to be applied to the insert into a semi-cured state is also used for a manufacturing method of a magnetic encoder used to detect the number of rotations of a rotating body (for example, Patent Documents 2 and 3).

The "semi-cured state" is regarded to mean that the adhesive is not fully cured but has caused curing reaction to some degree (refer to Patent Document 2, paragraph [0046], and Patent Document 3, paragraph [0025]), and would not be flown out by the high-pressure molten plastic material injected from a gate into the molding die at the time of insert molding (for example, refer to Patent Document 1, paragraph [0011], Patent Document 2, paragraph [0043], and Patent Document 3, paragraph [0019]).

It is known that, in the technique of bringing the thermoset resin adhesive into a semi-cured state to adhere to both the metallic part and the plastic, it is not easy to hold the adhesive in the semi-cured state, and the semi-cured adhesive is unstable and causes large fluctuations in the strength of adhesion between the metallic part and the plastic with insufficient reproducibility (for example, refer to Patent Document 1, paragraph [0012]).

There is also well known a bearing device that includes a rotation speed detection device using the magnetic encoder in a rolling bearing (hub bearing) for automobile wheel support (for example, Patent Document 2, FIG. 1, and Patent Document 3, FIG. 1).

The bearing device is intended to support automobile wheels to be used in various environments. The magnetic encoder may be exposed to heavy weather conditions such as wind and snow, wind and rain, the hot sun, and the like, and may be used at about −40 to 120° C. with large temperature changes. In addition, the magnetic encoder may be encrusted with a snow melting agent including calcium chloride as a main ingredient or a highly aggressive oil or the like. These stresses are known to cause reduction in the adhesiveness of the magnetic encoder.

CITATION LIST

Patent Literatures

Patent Document 1: JP-A No. H06-182808
Patent Document 2: Japanese Patent No. 4189696
Patent Document 3: Japanese Patent No. 4432764

SUMMARY OF INVENTION

Technical Problem

In view of the foregoing circumstances, an object of the present invention is to provide an injection molding die that improves the strength of adhesion between an insert and a plastic in an insert molded article while suppressing fluctuations in the strength of adhesion, and a manufacturing method of an insert molded article.

Solution to Problem

The inventors of the present invention have found that, when the adhesive applied to the surface of the insert was brought into a semi-cured state, the adhesive was cured to some extent due to cross-linking reaction before contact with the molten plastic material, the reaction groups of the adhesive for joining with the molten plastic material decreased, and the force of joining between the adhesive and the plastic became weakened to cause reduction in the adhesion strength.

Considering that it is difficult to control the heating temperature and time for semi-curing the thermoset resin adhesive, the inventors have contemplated performing injection molding without semi-curing the adhesive to enhance the adhesion strength and suppress fluctuations in the adhesion strength.

Then, the inventors have studied conditions and molding die structures for adhering firmly the insert to the plastic in a stable manner without semi-curing the adhesive. The inventors have evaluated insert molded articles, including conventional ones, obtained by actual injection molding, and conducted flow analysis simulation of the molten plastic during injection molding. As a result, the following findings were obtained.

(1) As illustrated in FIG. 6 of Patent Document 2, when injection molding is conducted by the use of an injection molding die with a gate position set on the joining surface of the insert relative to the plastic (the surface to be joined to the plastic by a thermoset resin adhesive) and the adhesive in the "semi-cured state" (the adhesive cured to some degree due to cross-linking reaction), the adhesive is not flown out by the high-pressure molten plastic material injected into the molding die owing to the structure of the molding die as described in Patent Documents 1 to 3.

(2) When injection molding is conducted by the use of an injection molding die with a gate position on the joining surface and the adhesive in an uncured state, the adhesive near the gate is swept and flown out by the high-pressure molten plastic material (the adhesive is stripped off) as described in Patent Documents 1 to 3.

(3) The adhesive swept and flown by the high-pressure molten plastic material becomes entangled in the molten plastic material, moves toward the surface of the plastic of the insert molded article, and appears on the surface.

(4) Using an injection molding die with a gate position set on the joining surface (see FIG. 13(a)), when the high-pressure molten plastic material is injected from a gate G into a molding die cavity C, the high-flow velocity molten plastic material flows onto the surface of a thermoset resin adhesive B applied to the joining surface near the gate G due to the narrowed flow path. Accordingly, the shear velocity of the molten plastic material flowing onto the surface of the adhesive B near the gate G becomes higher to increase a wall surface shear stress generated on the surface of the adhesive B near the gate G.

(5) In contrast to this, using an injection molding die with a gate position separated in an out-of-plane direction from the surface of a thermoset resin adhesive applied to the joining surface of the insert relative to the plastic (see FIG. 13(b)), the high-pressure molten plastic material having passed through the gate G becomes lower in flow velocity before reaching the interface of the adhesive B. Accordingly, the flow velocity of the molten plastic material flowing onto the surface of the adhesive B near the gate G becomes lower than that using the injection molding die with the gate position on the joining surface. Therefore, the shear velocity of the molten plastic material flowing onto the surface of the adhesive B near the gate G becomes lower to decrease the wall surface shear stress generated on the surface of the adhesive B near the gate G.

(6) The force of the molten plastic material stripping the adhesive is proportional to the wall surface shear stress. Therefore, by decreasing the wall surface shear stress, it is possible to prevent the adhesive from being swept away by the high-pressure molten plastic material without having to bring the adhesive into a semi-cured state.

The inventors of the present invention have completed the present invention based on the foregoing findings.

Specifically, for solving the foregoing problems, the injection molding die according to the present invention is a molding die for use in injection molding in which an insert with a thermoset resin adhesive applied to a joining surface relative to a plastic is placed in the molding die and a molten material for the plastic is injected from a gate into a cavity of the molding die to manufacture an insert molded article, wherein the gate is arranged at a position separated by 0.2 mm or more in an out-of-plane direction from the surface of the adhesive applied to the joining surface of the insert.

According to the injection molding die, the gate is arranged at the position separated by 0.2 mm or more in the out-of-plane direction from the surface of the thermoset resin adhesive applied to the joining surface of the insert relative to the plastic. Accordingly, during injection molding using the molding die, the flow velocity of the molten plastic material flowing onto the surface of the adhesive applied to the joining surface of the insert near the gate becomes significantly lower than that using a molding die with the gate position set on the joining surface. Therefore, the shear velocity of the molten plastic material flowing onto the surface of the adhesive near the gate becomes significantly lower to decrease significantly the wall surface shear stress generated on the surface of the adhesive near the gate. The wall surface shear stress proportional to the force of the molten plastic material stripping the adhesive becomes significantly small, and it is possible to prevent the adhesive from being swept away by the high-pressure molten plastic material without having to bring the adhesive applied to the joining surface of the insert into the semi-cured state.

Since there is no need to bring the adhesive into the semi-cured state, it is possible to conduct injection molding without bringing the adhesive into the semi-cured state in which it is difficult to control the heating temperature and time and the adhesive is unstable, thereby reducing fluctuations in the strength of adhesion between the insert and the plastic in the insert molded article.

Further, since the adhesive is not brought into the semi-cured state where the adhesive would be cured to some degree by cross-linking reaction before contact with the molten plastic material during injection molding, the force of joining between the adhesive and the plastic does not become weakened, thereby improving the strength of adhesion between the insert and the plastic in the insert molded article.

It is preferred that the insert has an annular shape, the gate is an inner disc gate, and the molding die has an insert core-type molding die structure or a slide core-type molding die structure.

According to the injection molding die, the insert has an annular shape and the gate is an inner disc gate, which allows a molded article to be obtained by the insert-core or slide core-type molding die structure.

Accordingly, when the insert has an annular shape and the gate is an inner disc gate, it is possible to realize readily and reliably the gate arrangement at a position separated by 0.2 mm or more in an out-of-plane direction from the surface of the thermoset resin adhesive applied to the joining surface of the insert relative to the plastic as a feature of the present invention, by the use of the insert-core or slide core-type molding die structure.

For solving the foregoing problem, a manufacturing method of an insert molded article of the present invention is a manufacturing method of an insert molded article using the injection molding die, including: an adhesive application step of applying the adhesive to a surface of the insert including the joining surface; a natural drying step of volatilizing a solvent contained in the adhesive by natural drying or a drying and solidification step of volatilizing the solvent contained in the adhesive to dry and solidify the adhesive under temperature conditions lower than the temperature at which the adhesive starts cross-linking reaction; and an injection molding step of placing the insert having undergone the natural drying step or the drying and solidification step in the molding die and injecting the molten material for the plastic from the gate into the cavity of the molding die.

According to the manufacturing method of an insert molded article, since the insert molded article is manufactured by the use of the injection molding die, the gate is arranged at a position separated by 0.2 mm or more in an out-of-plane direction from the surface of the thermoset resin adhesive applied to the joining surface of the insert relative to the plastic. Accordingly, during injection molding using the molding die, the flow velocity of the molten plastic material flowing onto the surface of the adhesive applied to the joining surface of the insert near the gate becomes significantly lower than that using a molding die with the gate position set on the joining surface. Therefore, the shear velocity of the molten plastic material flowing onto the surface of the adhesive near the gate becomes significantly lower to decrease significantly the wall surface shear stress generated on the surface of the adhesive near the gate. The wall surface shear stress proportional to the force of the molten plastic material stripping the adhesive becomes significantly small, and it is possible to prevent the adhesive from being swept away by the high-pressure molten plastic material without having to bring the adhesive applied to the joining surface of the insert into the semi-cured state.

Since there is no need to bring the adhesive into the semi-cured state, the step of volatilizing a solvent contained in the adhesive performed after the adhesive application step can be the natural drying step of volatilizing the solvent contained in the adhesive by natural drying or the drying and solidification step of volatilizing the solvent contained in the adhesive to dry and solidify the adhesive under temperature conditions at temperatures lower than the temperature at which the adhesive starts cross-linking reaction. Since the injection molding is performed without bringing the adhesive into the semi-cured state in which it is difficult to control the heating temperature and time and the adhesive is unstable, it is possible to reduce fluctuations in the strength of adhesion between the insert and the plastic in the insert molded article.

Further, since the adhesive is not brought into the semi-cured state where the adhesive would be cured to some degree by cross-linking reaction before contact with the molten plastic material at the injection molding step, the force of joining between the adhesive and the plastic does not become weakened, thereby improving the strength of adhesion between the insert and the plastic in the insert molded article.

It is preferred that the insert molded article is a magnetic encoder for use in a bearing device for automobile wheel support, the insert is an annular fixing member attachable to a rotating body, and the plastic is an annular plastic magnet.

Accordingly, the manufacturing method of the insert molded article is used as the manufacturing method of the magnetic encoder for use in a bearing device for automobile wheel support. This makes it possible to improve the strength of adhesion between the annular fixing member and the annular plastic magnet while suppressing fluctuations in the strength of adhesion.

Therefore, it is possible to improve the strength of adhesion while fluctuations in the strength of adhesion in the magnetic encoder that is used in a bearing device for automobile wheel support and is subjected to severe stresses such as thermal stress and chemical stress under which the adhesiveness is likely to decrease. This achieves enhancement in the reliability of the magnetic encoder.

Advantageous Effects of Invention

The injection molding die and the manufacturing method of the insert molded article of the present invention described above provide significantly advantageous effects as follows:

(1) During injection molding, the wall surface shear stress generated on the surface of the thermoset resin adhesive applied to the joining surface of the insert relative to the plastic near the gate becomes significantly small. Therefore, it is possible to prevent the adhesive from being swept away by the high-pressure molten plastic material without having to bring the adhesive applied to the joining surface of the insert into the semi-cured state. Accordingly, it is possible to conduct injection molding without bringing the adhesive into the semi-cured state in which it is difficult to control the heating temperature and time and the adhesive is unstable, thereby reducing fluctuations in the strength of adhesion between the insert and the plastic in the insert molded article.

(2) Before contacting the molten plastic material during injection molding, the adhesive is not brought into the semi-secured state in which the adhesive would be cured to some extent due to cross-linking reaction, and the force of binding between the adhesive and the plastic does not become weakened. Accordingly, it is possible to improve the strength of adhesion between the insert and the plastic in the insert molded article.

BRIEF DESCRIPTION OF DRAWINGS

FIGS. 4(a) and 4(b) are enlarged vertical cross-sectional views of main components of an example of a molding die structure (slide-core type), FIG. 4(a) illustrating the state in which the molten plastic is injected into the closed molding die, and FIG. 4(b) illustrating the state in which the molding die is opened after cooling;

Figure 12:
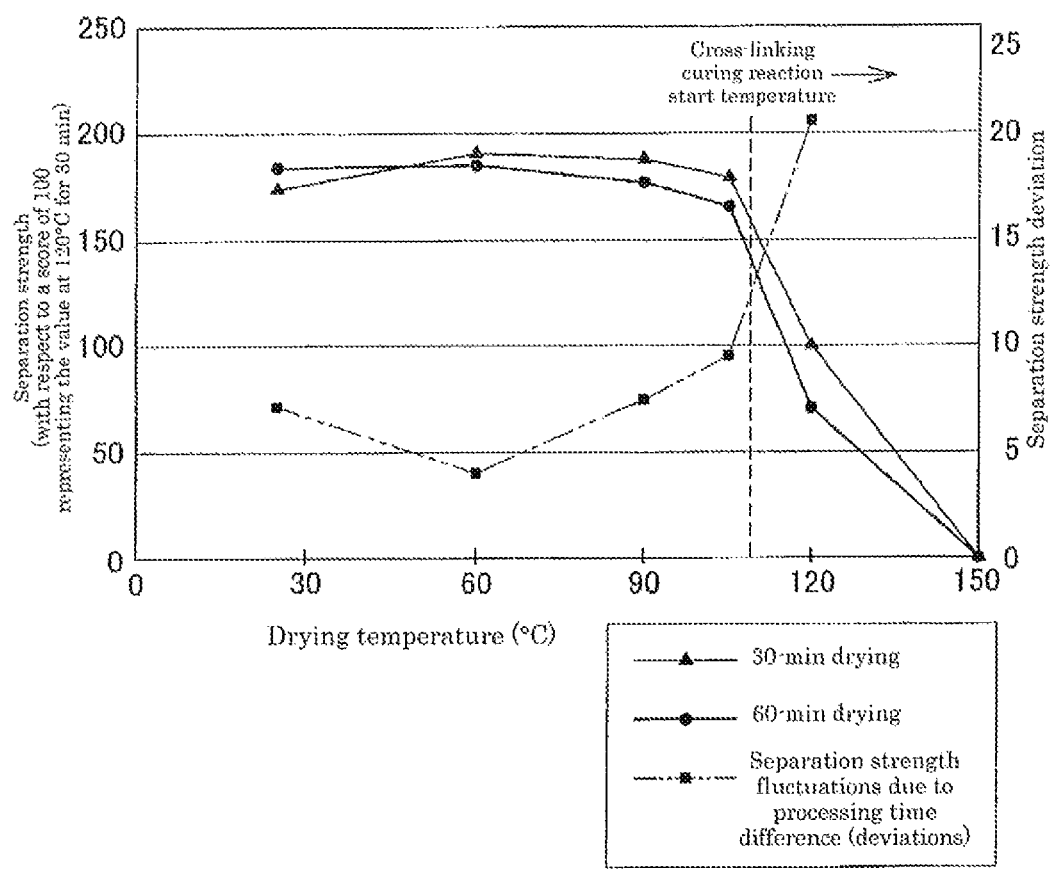
Figure 13A:
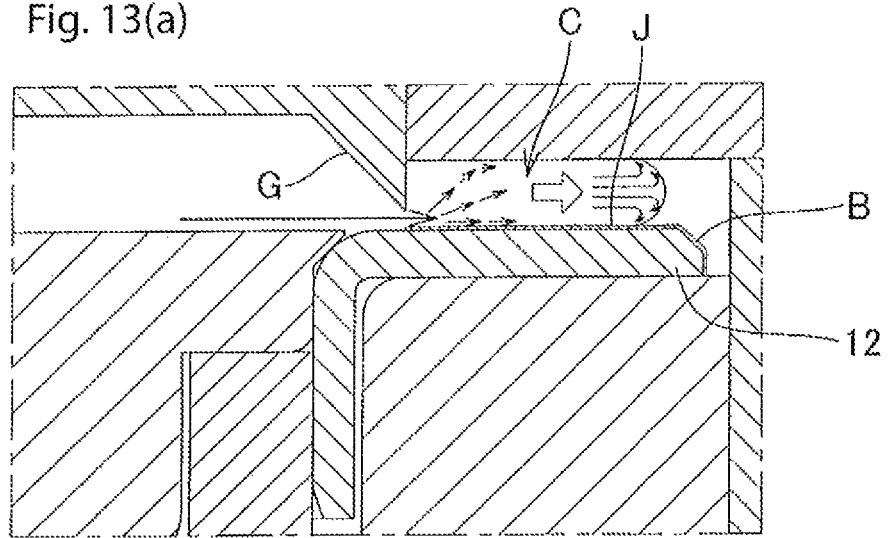
Figure 13B:
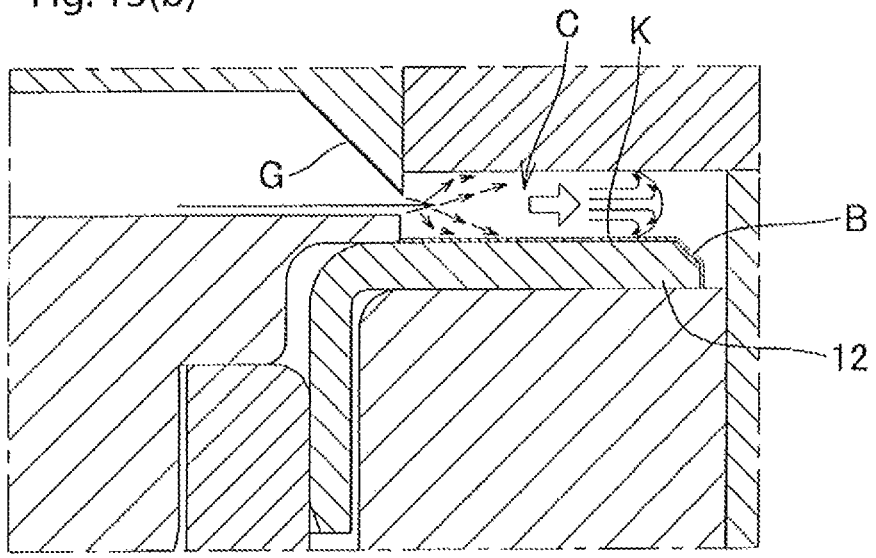

C.) or higher to cause cross-linking reaction and curing reaction on the thermoset resin adhesive layer;

FIG. 12 is a graph showing the relationship between the drying temperature and the separation strength of the dumbbell test specimen for adhesion strength evaluation; and FIGS. 13(a) and 13(b) are diagrams describing the flow velocity of the molten plastic material, FIG. 13(a) illustrating a molding die structure with a gate position set on the joining surface of the insert relative to the plastic, and FIG. 13(b) illustrating a molding die structure with a gate position set at a position separated in the out-of-plane direction from the surface of the thermoset resin adhesive applied to the joining surface.

DESCRIPTION OF EMBODIMENTS

The present invention will be described below in detail.
<Injection Molding Die>

The injection molding die of the present invention is configured to fix an insert with a thermoset resin adhesive applied to a joining surface relative to a plastic, and include a cavity as a molding space into which the molten plastic material is to be charged and a gate through which the molten plastic material is to be injected into the cavity. In addition, the gate is arranged at a position separated by 0.2 mm or more in an out-of-plane direction (vertical to the joining surface) from the surface of the adhesive applied to the joining surface of the insert (to which the plastic is joined by the adhesive).

The plastic used in the present invention contains preferably a thermoplastic resin such as polyamides (PA6, PA12, PA612, and others) and polyphenylene sulfide (PPS), for example. There are no particular limitations on the melting points of the thermoplastic resins and the physical properties of the same such as flexural modulus.

When a plastic magnet is used as the plastic to be joined to the insert via the thermoset resin adhesive, the plastic magnet is formed from a magnet material containing magnetic powder, a thermoplastic resin, and an additive as necessary. The plastic magnet is an approximately annular member attached to the surface of the insert at a desired position.

The magnetic powder as a material for the plastic magnet is magnetic powder for use in plastic magnet parts of commercial magnetic encoders manufactured by insert molding. For example, the magnetic powder may be ferrite-based magnetic powder such as strontium ferrite or barium ferrite, or rare-earth magnetic powder such as neodymium- or samarium-based one. In addition, the ferrite may be mixed with lanthanum or cobalt, or part of the ferrite may be replaced with rare-earth magnetic powder such as neodymium-iron-boron, samarium-cobalt, or samarium-iron, to improve the magnetic property of the ferrite. These magnetic powders may be used singly or in combination of two or more.

As the thermoplastic resin as a material for the plastic magnet, a thermoplastic resin such as polyamides (PA6, PA12, PA612, and others) or polyphenylene sulfide (PPS) can be preferably used, for example.

The additive as a material for the plastic magnet may be an organic additive such as carbon fiber, an inorganic additive such as glass beads, glass fiber, talc, mica, silicon nitride (ceramic), and crystalline (non-crystalline) silica, benzene sulfonic acid alkyl amides, toluene sulfonic acid alkyl amides, and hydroxybenzoic acid alkyl esters. They may be used singly or in combination of two or more.

The contents of the thermoset resin, the magnetic powder, and the additive in the plastic magnet merely need to be the same as those of plastic magnet parts of commercial magnetic encoders, although there are no particular limitations. The content of the magnetic powder falls within a range of 75 to 92 weight %.

The thermoset resin adhesive for use in the present invention may be a phenol resin adhesive, an epoxy resin adhesive, or the like, for example.

The phenol resin adhesive may be formed by dissolving a novolac-type phenol resin or a resol-type phenol resin, and a curing agent such as hexamethylenetetramine in a solvent such as methanol or methyl ethyl ketone, for example. In addition, the adhesive may be mixed with a novolac-type epoxy resin to improve adhesiveness.

The epoxy resin adhesive may be a one-component epoxy adhesive as a liquid concentrate capable of being diluted with a solvent. The one-component epoxy adhesive is composed of an epoxy resin and a curing agent. The one-component epoxy adhesive may be further mixed as necessary with another epoxy compound for use as a reactive diluent, a curing accelerator for improving the thermal curing rate, an inorganic filler effective in improving heat resistance and curing distortion resistance, a cross-linking rubber fine particles for improving flexibility resulting in deformation under stress, and the like.

The epoxy resin may be a bisphenol A-type epoxy resin, a bisphenol F-type epoxy resin, a bisphenol AD-type epoxy resin, a naphthalene-type epoxy resin, a biphenyl-type epoxy resin, a glycidyl amine-type epoxy resin, an alicyclic epoxy resin, a dicyclopentadiene-type epoxy resin, a phenol novolac-type epoxy resin, a polyester-modified epoxy resin, a silicone-modified epoxy resin, or the like, for example, although there is no particular limitation.

The curing agent may be any of amine curing agents such as an aliphatic amine, an alicyclic amine, and an aromatic amine; polyamide-based curing agents; acid anhydride-based curing agents such as phthalic anhydride, methyl tetrahydrophthalic anhydride, endo methylene-tetra-hydro phthalic anhydride, methylene-endo-methylenetetrahydrophthalic anhydride, methylhexahydrophthalic anhydride, or trimellitic anhydride; secondary or tertiary amines; imidazoles; 1,3-bis(hydrazinocarboethyl)-5-isopropylhydantoin, eicosanedioic acid dihydrazide; adipic acid dihydrazide; dicyandiamide; and 7,11-octadecadien-1,18-dicarbohydrazide, for example, although there is no particular limitation.

The reactive dilution agent may be alkyl mono glycidyl ether, alkyl diglycidyl ether, alkylphenol monoglycidyl ether, or the like, for example. Specifically, the reactive dilution agent may be 2-ethylhexyl glycidyl ether, allyl glycidyl ether, phenyl glycidyl ether, t-butyl phenyl glycidyl ether, or the like, although there is no particular limitation.

The curing accelerator is used to increase the rate of curing reaction in the case of using a curing agent such as acid anhydride or dicyandiamide. The curing accelerator may be any of imidazole compounds such as 1-cyanoethyl-2-ethyl-4-methylimidazole, 2-methylimidazole, 2-ethyl-4-methylimidazole, 2-undecylimidazole, and 2-phenylimidazole; carboxylic acids such as adipic acid; tertiary amines or tertiary amine salts such as dimethylbenzylamine and tris (dimethylaminomethyl) phenol; phosphines or phosphonium salts such as triphenylphosphine and tetraphenylphosphonium tetraphenyl borate; quaternary ammonium salts such as tetrabutylammonium bromide; and alkyl ureas such as 3-(3',4'-dichlorophenyl)-1,1-dimethyl urea, for example, although there is no particular limitation.

The inorganic filler may be molten silica powder, crystalline silica, quartz glass powder, crystalline glass powder, glass fiber, alumina powder, talc, mica, aluminum powder, titanium oxide, silica titania, boron nitride, aluminum nitride, silicon nitride, magnesia, or magnesium silicate, for example. They may be used singly or in combination of two or more.

The cross-linking rubber fine particles may be formed from vulcanized acrylonitrile-butadiene rubber, acrylic rubber, silicone rubber, urethane rubber, or the like having carboxyl groups in molecular chains, for example. The diameter of the cross-linking rubber fine particle may be 1 μm or less on the average, preferably about 30 to 200 nm as ultrafine particles, for example, although there is no particular limitation.

The solvent contained in the epoxy resin adhesive may be any of aromatic hydrocarbons such as toluene and xylene, a mixture of the aromatic hydrocarbon and ketones and alcohols, and naphthenic hydrocarbons such as cyclohexane, for example, although there is no particular limitation.

The insert of the present invention is a metallic part and has an annular shape, for example, but the shape of the insert is not limited to the annular shape.

The insert molded article of the present invention is formed by joining and integrating the plastic with the insert and has an annular shape, for example, but the shape of the insert molded article is not limited to the annular shape.

The gate of the injection molding die of the present invention is a disc gate, for example, but may be any other kind of gate such as a side gate.

The present invention is effective in particular in the case where the gate is thin and the gate passage flow velocity is high (the shear velocity near the gate is high).

<Manufacturing Method of the Insert Molded Article>

A manufacturing method of an insert molded article of the present invention is a manufacturing method of an insert molded article using the injection molding die, including: an adhesive application step of applying the thermoset resin adhesive to a surface of the insert including the joining surface relative to the plastic; a natural drying step of volatilizing a solvent contained in the adhesive by natural drying or a drying and solidification step of volatilizing the solvent contained in the adhesive to dry and solidify the adhesive under temperature conditions at temperatures lower than the temperature at which the adhesive starts cross-linking reaction; and an injection molding step of placing the insert having undergone the natural drying step or the drying and solidification step in the injection molding die and injecting the molten plastic material from the gate into a cavity of the molding die.

(Adhesive Application Step)

At this step, the thermoset resin adhesive is applied to the surface of the insert including the joining surface relative to the plastic.

As a method of applying the thermoset resin adhesive to the surface of the insert including the joining surface relative to the plastic, the adhesive may be applied to part of the surface of the insert (including the joining surface) using a brush, a roller, a spray, or the like.

Alternatively, the surface of the insert may be immersed in the liquid thermoset resin adhesive. Taking molding die contamination into consideration, however, it is preferred to apply the adhesive to part of the surface of the insert (including the joining surface) so as not to extend beyond the joining surface relative to the plastic, if possible.

As for temperature conditions for applying the thermoset resin adhesive to the insert, the temperature needs to cause no solidification or cross-linking curing reaction of the adhesive, and may be room temperature, for example, although there is no particular limitation.

The thickness or resin amount of the thermoset resin adhesive applied to the insert needs to adhere and fix the plastic, although there is no particular limitation.

The surface of the insert to which the thermoset resin adhesive is applied is preferably subjected to roughening treatment or primer treatment from the viewpoint of improvement of an anchoring effect on the adhesive.

The roughening treatment may be blasting, chemical etching, chemical conversion, hairline processing, or the like.

The roughness of the roughened application surface of the insert preferably falls within a range of Ra 0.5 to 2 μn.

The roughness of the application surface can be measured in conformity with JIS B0601-1994.

The primer may be a silane-based primer, a phenol-based primer, an epoxy-based primer, or the like.

(Natural Drying Step)

At this step, the thermoset resin adhesive applied to the surface of the insert at the adhesive application step is naturally dried at room temperature to volatilize the solvent contained in the adhesive.

(Drying and Solidification Step)

At this step, the thermoset resin adhesive applied to the surface of the insert at the adhesive application step is placed under a temperature condition lower than the temperature at which the adhesive starts cross-linking reaction to volatilize the solvent contained in the adhesive and dry and fix the adhesive on the surface of the insert.

The thermoset adhesive has the property of starting cross-linking reaction and becoming cured when being heated to a predetermined temperature. Accordingly, in the present invention, the temperature at which the thermoset resin adhesive starts cross-linking reaction and begins curing refers to "temperature at which the thermoset resin adhesive starts cross-linking reaction."

The "drying and solidification" of the thermoset resin adhesive here refers to the state before the start of cross-linking reaction by heating, in which the solvent contained in the applied thermoset plastic resin adhesive is volatilized and the ingredients of the thermoset resin adhesive are solidified.

There is no particular limitation on the degree of evaporation of the solvent at the time of drying and solidification. The solvent may be volatilized to the degree at which, when the surface of the applied thermoset resin adhesive is directly touched with fingers, the thermoset resin adhesive does not stick to the fingers, or to the degree that the solvent hardly remains. In particular, from the viewpoint of ease of adhesion to the plastic, the adhesive is preferably dried and solidified to the degree that the solvent hardly remains. The applied thermoset resin adhesive changes moderately in color as being dried, and the degree of the drying and solidification can be checked by observing visually the state of color change.

The thermoset resin adhesive needs to be dried and solidified at a temperature lower than the temperature at which the thermoset resin adhesive starts cross-linking reaction. The specific temperature for the drying and solidification is decided as appropriate depending on the used thermoset resin adhesive. For example, in the case of using a phenol resin adhesive, the temperature is desirably adjusted to be lower than 110° C., preferably 25 to 105° C., from the viewpoint of short-time drying and solidification.

Alternatively, the thermoset resin adhesive may be dried and solidified with temperature increases in plural stages starting from a predetermined temperature, from the viewpoint of efficient drying and solidification.

In this case, there is no particular limitation on the difference between the first temperature and the second temperature or the like.

The time of drying and solidification can be decided as appropriate depending on the temperature of drying and solidification as far as the solvent in the thermoset resin adhesive can be evaporated to solidify the solid content of the thermoset resin. For example, the time of drying and solidification is preferably adjusted to 30 to 60 minutes or more from the viewpoint of stable drying and solidification at an industrial level.

As a means for drying and solidification, for example, there is a method by which a gas adjusted to a predetermined temperature is blown onto the surface of the thermoset resin adhesive applied to the insert. In addition, there is another method by which the insert with the thermoset resin adhesive applied is left at rest at a predetermined temperature under reduced-pressure environment or ordinary-pressure environment. The foregoing methods may be used in combination.

In the present invention, the thermoset resin adhesive is dried and solidified at a temperature lower than the temperature at which the thermoset resin adhesive starts cross-linking reaction, which eliminates the need for semi-curing in which it is difficult to control the heating temperature and time. In addition, the force of binding between the thermoset resin adhesive and the plastic can be enhanced by suppressing the decrease of reaction groups in the thermoset resin adhesive for joining with the plastic material.

(Injection Molding Step)

At this step, the insert having undergone the natural drying step or the drying and solidification step is placed in the injection molding die, and the molten plastic material is injected from the gate into the cavity of the molding die.

The injection molding die with the gate arranged at a position separated by 0.2 mm or more in the out-of-plane direction from the surface of the thermoset resin adhesive applied to the joining surface of the insert relative to the plastic is used. Accordingly, the thermoset resin adhesive applied to the surface of the insert at the adhesive application step and having the solvent volatilized at the natural drying step or the drying and solidification step is not swept or flown out by the high-pressure molten plastic material (the adhesive is not stripped off) even when the adhesive is not brought into the semi-cured state.

Next, the injection molding die and the manufacturing method of the insert molded article according to embodiments of the present invention will be described.

<Embodiments of the Injection Molding Die and the Insert Molded Article>

Figure 1:
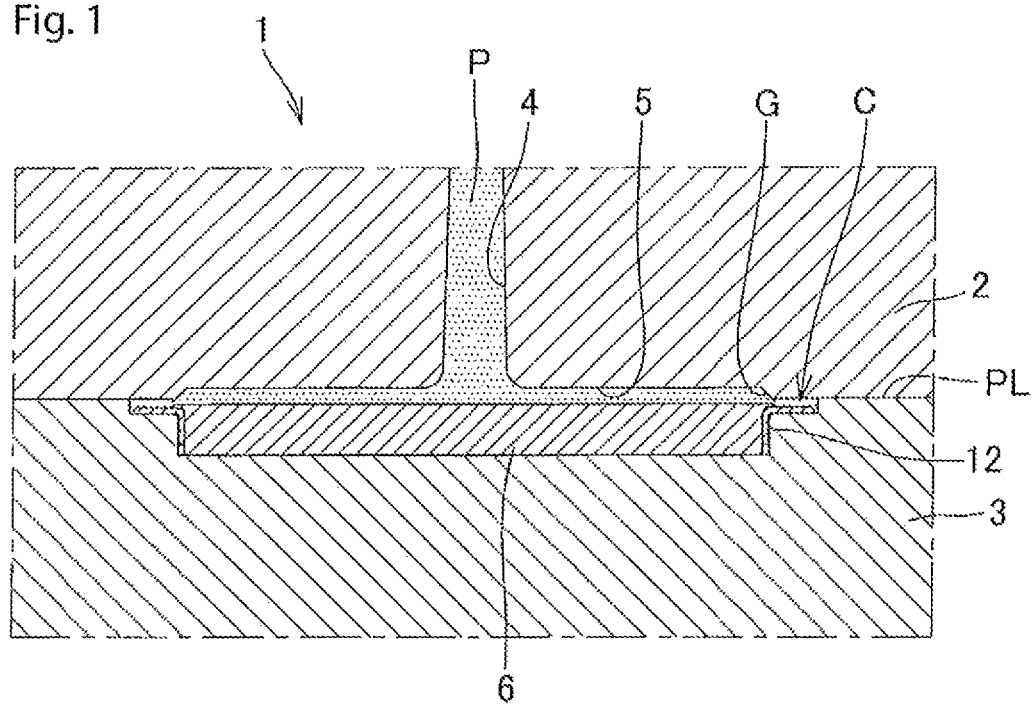
FIG. 1 is an enlarged vertical cross-sectional view of main components of an example of an injection molding die according to an embodiment of the present invention.

As illustrated in the enlarged vertical cross-sectional view of main components of FIG. 1, an injection molding die 1 according to an embodiment of the present invention is attached to an injection molding machine by fixing a stationary attachment plate not illustrated with bolts to a fixed platen and fixing a movable attachment plate not illustrated with bolts to a movable platen.

Figure 2A:
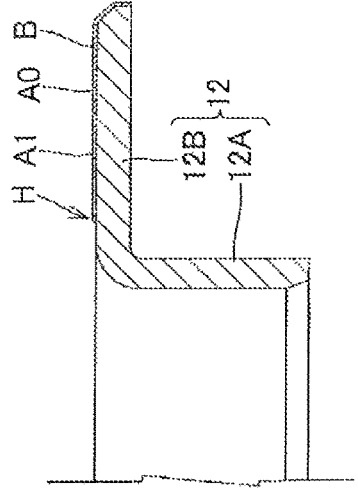
FIG. 2(a) is a vertical cross-sectional view illustrating the state in which a thermoset resin adhesive is applied to a joining surface of an annular fixing member as an insert relative to a plastic.
Figure 2B:
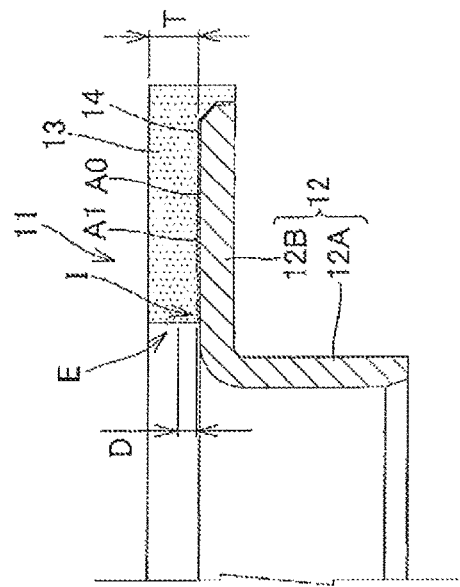
FIG. 2(b) is a vertical cross-sectional view of a magnetic encoder as a ring-shaped insert molded article manufactured by the injection molding die.

The insert molded article molded by the injection molding die 1 is a magnetic encoder 11 illustrated in the vertical cross-sectional view of FIG. 2(b). The magnetic encoder 11 is composed of an annular fixing member 12 as an insert and an annular plastic magnet 13 as a plastic. A thermoset resin adhesive layer 14 intervenes between the annular fixing member 12 and the annular plastic magnet 13.

The thickness of the thermoset resin adhesive layer 14 is as very small as about several µm to several tens µm, for example. However, FIGS. 2 to 5 and 13 illustrate the thermoset resin adhesive layer 14 in enlarged sizes for the sake of visibility.

The annular fixing member 12 is a steel plate composed of a cylindrical part 12A and an annular part 12B extending outward in the radial direction from one end edge of the cylindrical part 12A. The annular fixing member 12 is formed by pressing a stainless-steel plate with a thickness of 0.6 mm, for example.

The shape of the annular fixing member 12 is not limited to the one illustrated in FIG. 2(b) as far as the annular fixing member 12 includes at least the cylindrical part 12A and the annular part 12B.

The annular plastic magnet 13 is formed such that a burr of a gate mark E formed at a position separated by a distance D (D≥0.2 mm) from a surface A1 of a thermoset resin adhesive B (the thermoset resin adhesive layer 14) (a distance from the surface A1 in the out-of-plane direction) applied to the annular fixing member 12 is sized so as not to extend toward the inner side of the magnetic encoder 11, and thickness T of the annular plastic magnet 13 illustrated in FIG. 2(b) is about 0.9 mm, for example.

The annular plastic magnet 13 is formed from a magnet material containing the magnetic powder, the thermoplastic resin, and the additive.

The contents of the thermoplastic resin, the magnetic powder, the additive, and the like in the annular plastic magnet 13 need to be the same as those of the plastic magnet of a commercial magnetic encoder as described above, although there are no particular limitations.

The rotating body to which the magnetic encoder 11 of the embodiment is attached by the annular fixing member 12 is a rotating body to which a conventional magnetic encoder is attached such as a device for detecting the number of rotations of automatic wheels or a rotation speed detection device of a relatively rotating bearing part, for example.

By attaching the magnetic encoder 11 to the rotating body, the magnetic encoder 11 rotates along with the rotation of the rotating body, and the rotation of the annular plastic magnet 13 magnetized circumferentially in a multipolar manner is sensed by a sensor opposed to the annular plastic magnet 13 to detect the rotation speed (the number of rotations) of the rotating body.

<Embodiment of the Manufacturing Method of the Insert Molded Article>

(Adhesive Application Step)

As illustrated in the vertical cross-sectional view of FIG. 2(a), the thermoset resin adhesive B is applied by a brush, a roller, a spray, or the like to a joining surface A0 of the annular fixing member 12, that is, the joining surface A0 relative to the annular plastic magnet 13 illustrated in FIG. 2(b).

(Drying and Solidification Step)

Next, the annular fixing member 12 to which the thermoset resin adhesive B was applied at the adhesive application step is placed and left at rest in a room adjusted at a predetermined temperature lower than the temperature at which the adhesive B starts cross-linking reaction to volatilize the solvent contained in the adhesive B and dry and solidify the adhesive B on the surface (the joining surface A0) of the annular fixing member 12.

(Injection Molding Step)

Next, as illustrated in the enlarged cross-sectional view of the main components of FIG. 1, the annular fixing member 12 with the thermoset resin adhesive B dried and solidified at the drying and solidification step is set in a movable molding die 3, and the movable molding die is closed. Then, a molten plastic magnet material P is injected from a sprue 4 into the molding die. The molten plastic magnet material P is charged from the inner disc gate G through a runner 5 into the cavity C between the fixed die plate 2 and the movable die plate 3 (also see the enlarged vertical cross-sectional view of the main components of FIG. 3(a)).

There is no particular limitation on the temperature of the molten plastic magnet material P as far as the plastic magnet material P has a viscosity enough to be injected and is at a temperature enough not to be solidified. The temperature may be 200 to 360° C., for example.

The direction of the sprue 4 (the direction of injecting the molten plastic magnet material P) is horizontal.

Figure 3B:
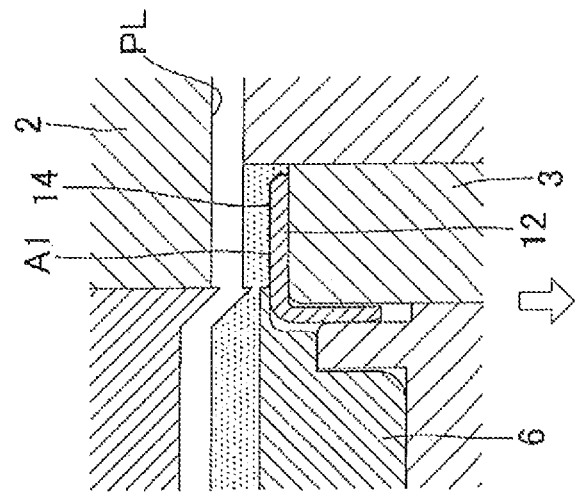
FIGS. 3(a) and 3(b) are enlarged vertical cross-sectional views of main components of an example of a molding die structure (insert-core type), FIG. 3(a) illustrating the state in which the molten plastic is injected into the closed molding die, and FIG. 3(b) illustrating the state in which the molding die is opened after cooling.

The molten plastic magnet material P is cooled and solidified, and the movable die plate 3 is opened from a parting line PL as illustrated in the enlarged vertical cross-sectional view of the main components of FIG. 3(b). Then, the molded article before gate cutting and the insert core 6 are protruded by an ejector pin not illustrated and removed from the molding die.

Next, an example of a molding die structure different from the insert core type illustrated in FIG. 3 will be described.

The enlarged vertical cross-sectional views of main components of FIG. 4 illustrate a slide core-type molding die structure (inner-diameter slide core type).

As illustrated in FIG. 4(a), the molten plastic magnet material P is charged into the cavity C and is cooled and solidified. Then, as illustrated in FIG. 4(b), a slide core 7 is slid radially inward and withdrawn from the molded article. The movable die plate 3 is opened from the parting line PL, and the molded article before gate cutting is protruded by an ejector pin not illustrated and is removed from the molding die.

Next, the gate is cut to separate the insert molded article (the magnetic encoder 11) from the gate.

(Thermal Hardening Step)

Next, the magnetic encoder 11 as insert molded article obtained at the injection molding step is subjected to thermal curing treatment at a temperature equal to or higher than the temperature at which the thermoset resin adhesive B starts cross-linking reaction, thereby to obtain the completed magnetic encoder 11 (the magnetic encoder 11 before magnetization when the magnetization described later is not performed at the injection molding step).

At this step, the magnetic encoder 11 obtained at the injection molding step is subjected to thermal curing treatment at a temperature equal to or higher than the temperature at which the thermoset resin adhesive B starts cross-linking reaction to cause the cross-linking reaction and curing reaction of the dried and solidified thermoset resin adhesive B between the annular fixing member 12 and the annular plastic magnet 13, whereby the three members 12, B, and 13 are integrated together.

The temperature equal to or higher than the temperature at which the adhesive starts cross-linking reaction falls within a range of 110 to 180° C. at which the resin used in the adhesive can cause cross-linking reaction and curing reaction regardless of the kind of the resin.

The thermal curing treatment may be performed with temperature increase in stages. For example, the first temperature may be adjusted within a range of 110 to 140° C., and the second temperature may be adjusted within a range of 140 to 180° C. The upper limit of the temperature equal to or higher than the cross-linking reaction start temperature may be higher than 180° C. from the viewpoint of shortening the treatment time.

In the present invention, the annular plastic magnet 13 is magnetized circumferentially in a multipolar manner. The magnetization may be conducted by performing injection molding in an adjusted magnetic field at the injection molding step to orient the magnetic powder in the magnetic field. Alternatively, the magnetic encoder obtained at the thermal curing step may be demagnetized, and then be magnetized in a multipolar manner by the use of a separately prepared magnetizing device such as a magnetizing yoke such that N poles and S poles alternate in the circumferential direction of the plastic magnet.

EXAMPLES

<Evaluation by Flow Analysis of the Molten Plastic Material>

The flow analysis of the molten plastic material (hereinafter, called "molten resin") was conducted using Simulation Moldflow as a plastic injection molding simulation tool.

(Analysis Conditions and Evaluation Items)

The material data were: a PA12-ferrite bond magnet HM-1220K; resin temperature of 268° C.; molding die temperature of 80° C.; and injection flow rate of 43 cc/s. The evaluation items were: the molten resin flow velocity of the gate part and the surface of the adhesive near the gate; and the wall surface shear stress on the gate part and the surface of the adhesive near the gate.

The magnitude of the wall surface shear stress of the surface of the adhesive near the gate is proportional to the force of the molten resin stripping off the adhesive.

EXAMPLES

Example 1

Figure 3A:
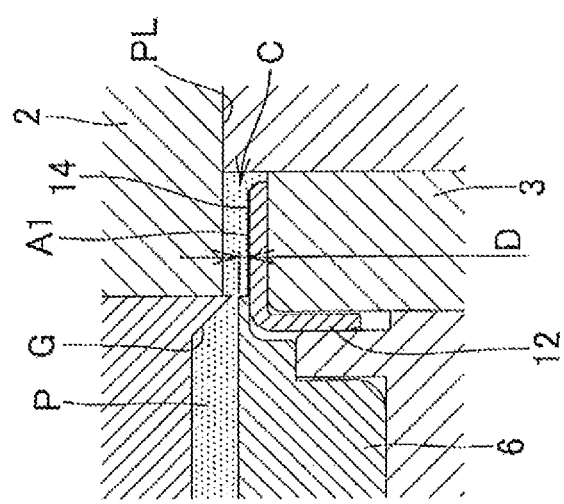

Example 1 had the molding die structure illustrated in the enlarged vertical cross-sectional view of the main components of FIG. 3(a), in which the out-of-plane distance D from the surface A1 of the adhesive applied to the joining surface A0 of the insert (the annular fixing member 12) relative to the plastic (the annular plastic magnet 13 illustrated in FIG. 2(b)) to the gate G was 0.2 mm.

Example 2

Example 2 had the molding die structure illustrated in the enlarged vertical cross-sectional view of the main components of FIG. 3(a), in which the distance D was 0.25 mm.

Example 3

Example 3 had the molding die structure illustrated in the enlarged vertical cross-sectional view of the main components of FIG. 3(a), in which the distance D was 0.45 mm.

COMPARATIVE EXAMPLES

Comparative Example 1

Comparative example 1 had the molding die structure illustrated in the enlarged vertical cross-sectional view of the main components of FIG. 3(a), in which the distance D was 0.1 mm.

Comparative Example 2

Figure 5A:
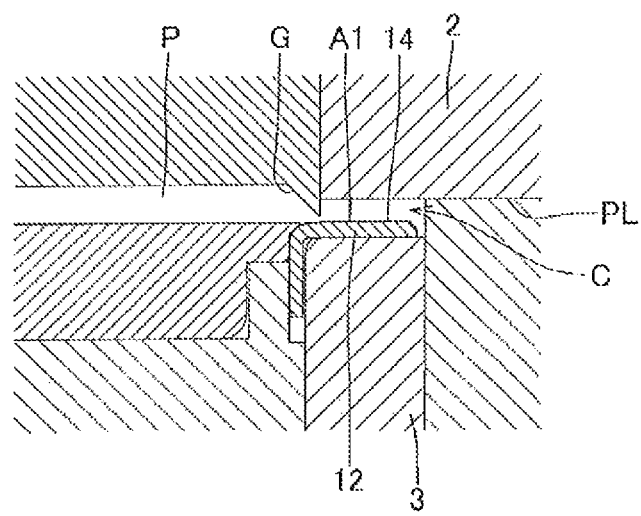
FIGS. 5(a) and 5(b) are enlarged vertical cross-sectional views of main components of an example of a molding die structure with a gate position set on a joining surface of an insert relative to a plastic.
Figure 5B:
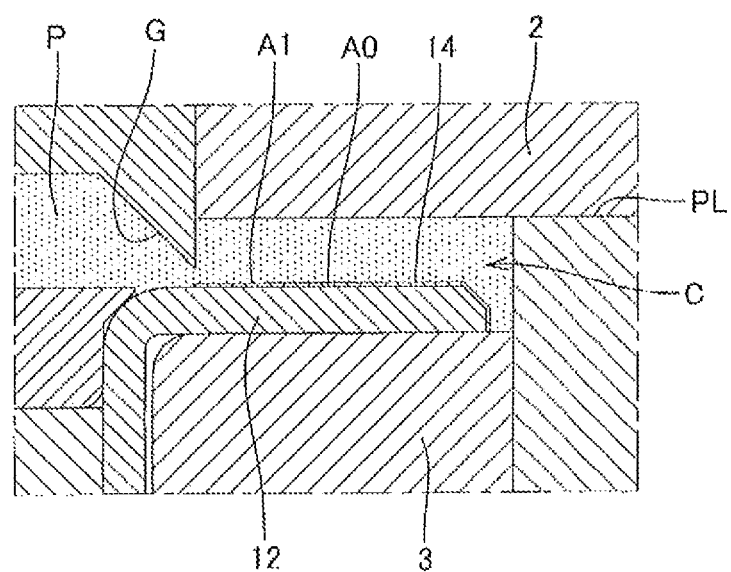

Comparative example 2 had the molding die structure illustrated in the enlarged vertical cross-sectional view of the main components of FIG. 5, that is, had the gate position set on the joining surface A0 of the insert (the annular fixing member 12) relative to the plastic (the annular plastic magnet 13 illustrated in FIG. 2(*b*)).

<Analysis Results and Considerations>

Table 1 show analysis results.

The flow velocity of the molten resin on the adhesive surface A1 near the gate G was 24 cm/s in the molding die structure with the out-of-plane distance D of 0.1 mm from the adhesive surface A1 to the gate G as the comparative example 1 (the molding die structure illustrated in FIG. 3(*a*)), and 71 cm/s in the molding die structure with the gate position set on the joining surface A0 as the comparative example 2 (the molding die structure illustrated in FIG. 5).

In contrast, the flow velocity of the molten resin on the adhesive surface A1 near the gate G was 11 cm/s in the molding die structure with the out-of-plane distance D of 0.2 mm from the adhesive surface A1 to the gate G as the example 1 (the molding die structure illustrated in FIG. 3(*a*)), 7 cm/s in the molding die structure with the distance D of 0.25 mm as the example 2 (the molding die structure illustrated in FIG. 3(*a*)), and 4 cm/s in the molding die structure with the distance D of 0.45 mm as the example 3 (the molding die structure illustrated in FIG. 3(*a*)).

Accordingly, the examples 1, 2, and 3 have decreased the flow velocity of the molten resin on the adhesive surface A1 near the gate G to about 46%, about 29%, and about 17%, respectively, relative to the comparative example 1, and to about 15%, about 10%, and about 6%, respectively, relative to the comparative example 2.

The wall surface shear stress of the adhesive surface A1 near the gate G was 1.6 Mpa in the comparative example 1, and 2.6 MPa in the comparative example 2.

In contrast, the wall surface shear stress of the adhesive surface A1 near the gate G was 1.2 Mpa in the example 1, 1.2 MPa in the example 2, and 1.1 MPa in the example 3.

Accordingly, the examples 1, 2, and 3 have decreased the wall surface shear stress on the adhesive surface A1 near the gate G to about 75%, about 75%, and about 69%, respectively, relative to the comparative example 1, and to about 46%, about 46%, and about 42%, respectively, relative to the comparative example 2.

Figure 6:
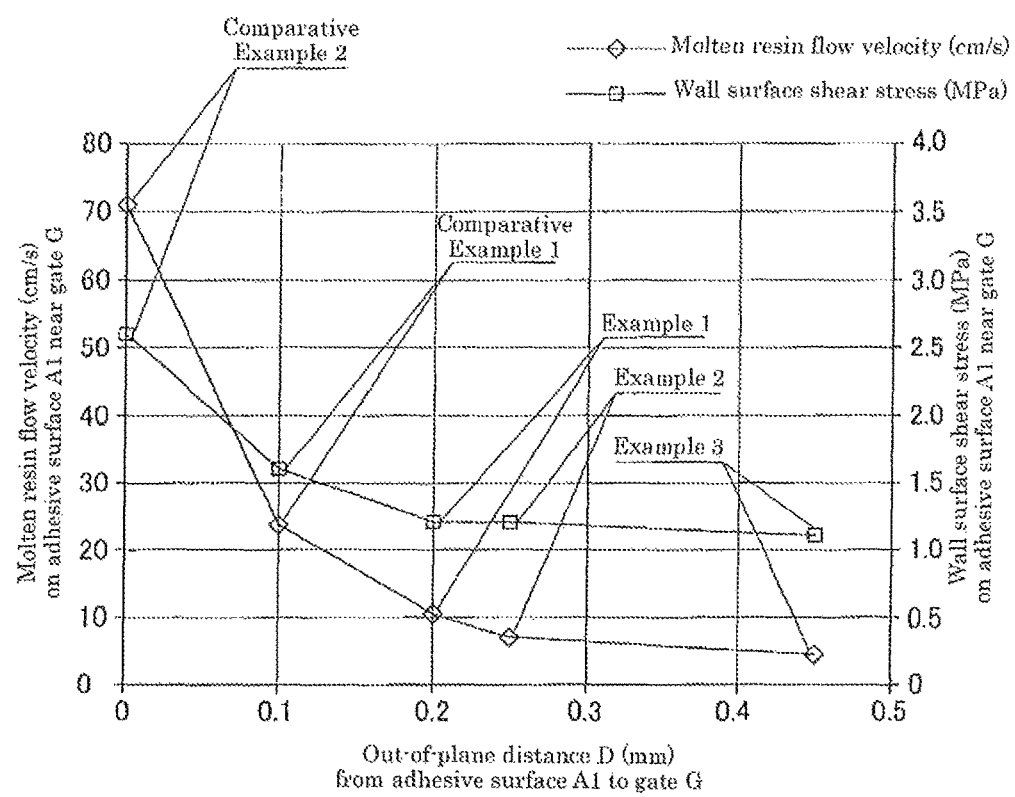
FIG. 6 is a graph representing the flow velocities of a molten resin and wall surface shear stresses on an adhesive surface A1 near a gate G relative to an out-of-plane distance D from the adhesive surface A1 to the gate G in examples 1 to 3 and comparative examples 1 and 2.

FIG. 6 is a graph of the analysis results in which the horizontal axis indicates the out-of-plane distance D (mm) from the adhesive surface A1 to the gate G, and the vertical axis indicates the molten resin flow velocity (cm/s) and the wall surface shear stress (MPa) on the adhesive surface A1 near the gate.

It can be seen from FIG. 6 that, when the out-of-plane distance D from the adhesive surface A1 to the gate G is set to be 0.2 mm or more as in the examples, the flow velocity and the wall surface shear stress of the molten resin on the adhesive surface A1 near the gate G become significantly lower than those of the comparative examples.

When the flow velocity of the molten resin flowing onto the adhesive surface A1 near the gate G becomes significantly lower, the shear velocity of the molten resin flowing onto the adhesive surface A1 near the gate G becomes significantly lower to decrease significantly the wall surface shear stress generated on the adhesive surface A1 near the gate G.

It can be seen from FIG. 6 that, when the distance D is set to be 0.2 mm or more, the wall surface shear stress on the adhesive surface A1 near the gate G becomes small and approximately uniform.

<Evaluation of the Insert Molded Article>

As the insert molded article illustrated in FIG. 2(*b*), the magnetic encoder 11 was formed experimentally by insert molding with the injection molding die.

(Experimental Conditions and Evaluation Item)

The plastic magnet was a PA12-based bond magnet, the molten resin temperature was 280° C., and the injection flow rate was 45 cc/s. The evaluation item was the presence or absence of appearance of the adhesive on the surface of the annular plastic magnet.

EXAMPLES

Examples were molded by the molding die structure illustrated in the enlarged vertical cross-sectional view of the major components of FIG. 3(*a*), in which the out-of-plane distance D from the surface A1 of the adhesive applied to the joining surface A0 of the insert (the annular fixing member 12) relative to the plastic (the annular plastic magnet 13 illustrated in FIG. 2(*b*)) to the gate G was 0.25 mm, 0.35 mm, and 0.45 mm, respectively.

TABLE 1

| Examples/<br>Comparative examples | | Example 1 | Example 2 | Example 3 | Comparative<br>Example 1 | Comparative<br>Example 2 |
|---|---|---|---|---|---|---|
| Molding die structure | | FIG. 3(a) | | | | FIG. 5 |
| Gate position | | Separation from adhesive surface<br>in out-of-plane direction | | | | On joining<br>surface |
| Out-of-plane distance D<br>from adhesive surface to gate (mm) | | 0.2 | 0.25 | 0.45 | 0.1 | — |
| Molten resin flow<br>velocity (cm/s) | Gate part | 98 | 98 | 97 | 97 | 98 |
| | Adhesive surface<br>near gate | 11 | 7 | 4 | 24 | 71 |
| Wall surface shear<br>stress (MPa) | Gate part | 2.4 | 2.4 | 2.4 | 2.4 | 2.6 |
| | Adhesive surface<br>near gate | 1.2 | 1.2 | 1.1 | 1.6 | 2.6 |

Example 4

In Example 4, the distance D was 0.25 mm, and the drying conditions of the thermoset resin adhesive applied to the insert were that the drying temperature was 60° C. which is lower than the temperature at which the adhesive starts cross-linking reaction and the drying time was 60 minutes.

Example 5

In Example 5, the distance D was 0.35 mm, and the drying conditions of the thermoset resin adhesive applied to the insert were that the drying temperature was 60° C. which is lower than the temperature at which the adhesive starts cross-linking reaction and the drying time was 60 minutes.

Example 6

In Example 6, the distance D was 0.45 mm, and the drying conditions of the thermoset resin adhesive applied to the insert were that the drying temperature was 60° C. which is lower than the temperature at which the adhesive starts cross-linking reaction and the drying time was 60 minutes.

Example 7

In Example 7, the distance D was 0.35 mm, and the drying conditions of the thermoset resin adhesive applied to the insert were that the drying temperature was 100° C. which is lower than the temperature at which the adhesive starts cross-linking reaction and the drying time was 30 minutes.

Comparative Examples

Comparative examples were molded by the molding die structure illustrated in the enlarged vertical cross-sectional view of FIG. 5, that is, had a gate position set on the joining surface A0 of the insert (the annular fixing member 12) relative to the plastic (the annular plastic magnet 13 illustrated in FIG. 2(b)).

Comparative Example 3

In the comparative example 3, the drying conditions of the thermoset resin adhesive applied to the insert were that the drying temperature was 60° C. which is lower than the temperature at which the adhesive starts cross-linking reaction and the drying time was 60 minutes.

Comparative Example 4

In the comparative example 4, the drying conditions of the thermoset resin adhesive applied to the insert were that the drying temperature was 100° C. which is lower than the temperature at which the adhesive starts cross-linking reaction and the drying time was 30 minutes.

<Experimental Results and Considerations>

Figure 10A:
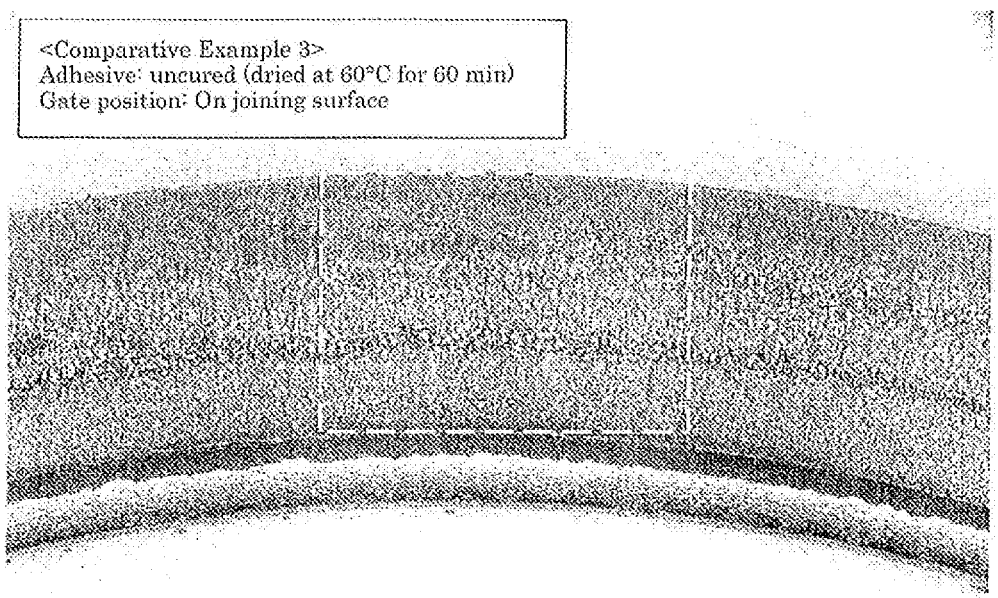
FIG. 10(a) is a photograph of an annular plastic magnet surface of a magnetic encoder in the comparative example 3 molded by the molding die structure illustrated in FIG. 5.
Figure 10B:
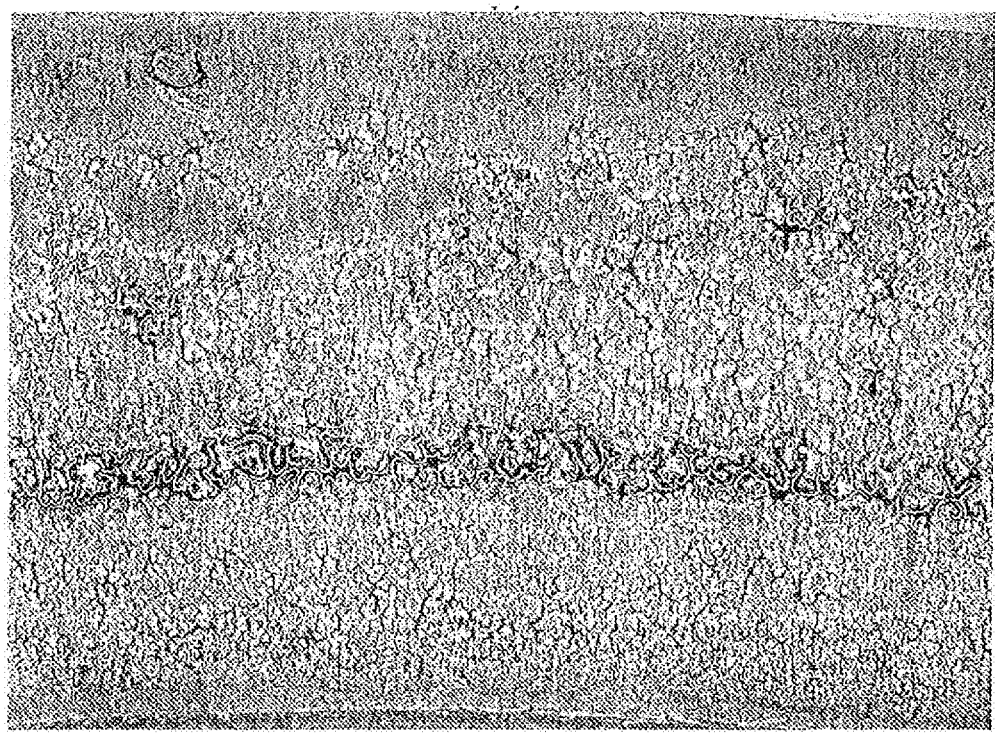
FIG. 10(b) is an enlarged photograph of the part surrounded by a broken line in FIG. 10(a)

It can be understood from the experimental results shown in Table 2 that the comparative examples 3 and 4 having the molding die structure illustrated in FIG. 5 had the appearance of the adhesive on the surface of the plastic magnet (see the photographs of the annular plastic magnet surface of the magnetic encoder in FIGS. 10(a) and 10(b) corresponding to the comparative example 3). In this manner, the magnetic encoder with the adhesive appearing on the surface of the plastic magnet has an adverse influence on the magnetic properties. Thus the magnetic encoder is not regarded as being practical without the need to evaluate the strength of adhesion between the annular fixing member and the plastic magnet and the like.

The phenomenon where the adhesive appears on the surface of the plastic magnet will be discussed. In the molding die structure illustrated in FIG. 5, when the drying temperature condition of the thermoset resin adhesive was set to a temperature lower than the temperature at which the adhesive starts cross-linking reaction, the flow velocity of the molten resin becomes higher on the adhesive surface near the gate as in the comparative example 2 of Table 1. Therefore, the shear velocity of the molten resin flowing onto the surface of the adhesive near the gate becomes higher to increase the wall surface shear stress generated on the adhesive surface near the gate.

Accordingly, it is considered that the adhesive near the gate (see a portion H of the adhesive B applied to the joining surface A0 near the gate illustrated in FIG. 2(a)) is swept and flown out (stripped off) by the high-pressure molten resin, and the adhesive is entangled and flown with the molten resin, moved together with the molten resin toward the surface of the plastic magnet, and then reaches and appears on the surface.

The magnetic encoders of the comparative examples 3 and 4 were cut in a radial direction vertical to the surface of the annular part 12B of the annular fixing member 12 (see FIG. 2(b)), and their cross sections were observed by an electron microscope. The observation has revealed that the adhesive near the gate (see a portion I of the thermoset resin adhesive layer 14 near the gate illustrated in FIG. 2(b)) disappeared.

Figure 7A:
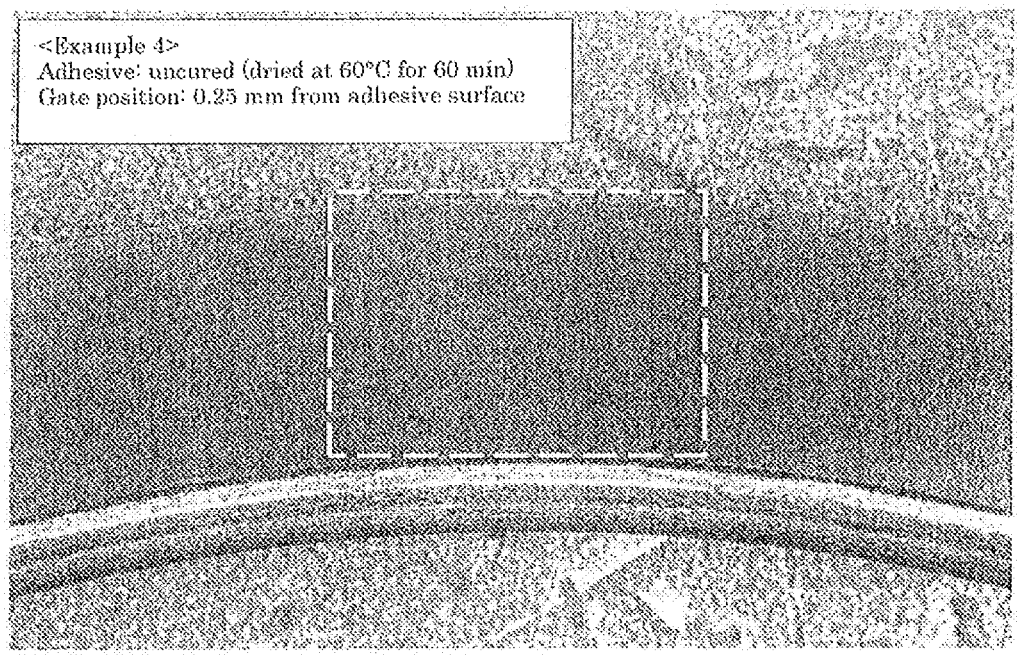
FIG. 7(a) is a photograph of an annular plastic magnet surface of a magnetic encoder in the example 4 molded by the molding die structure illustrated in FIG. 3(a)
Figure 7B:
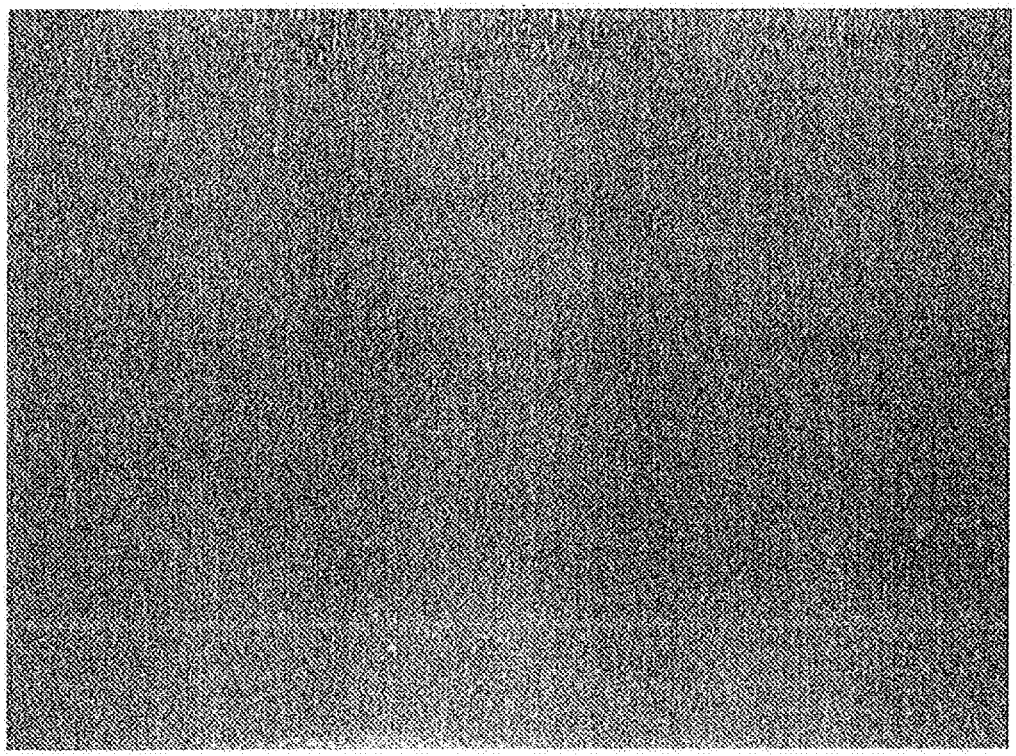
FIG. 7(b) is an enlarged photograph of the part surrounded by a broken line in FIG. 7(a)
Figure 8A:
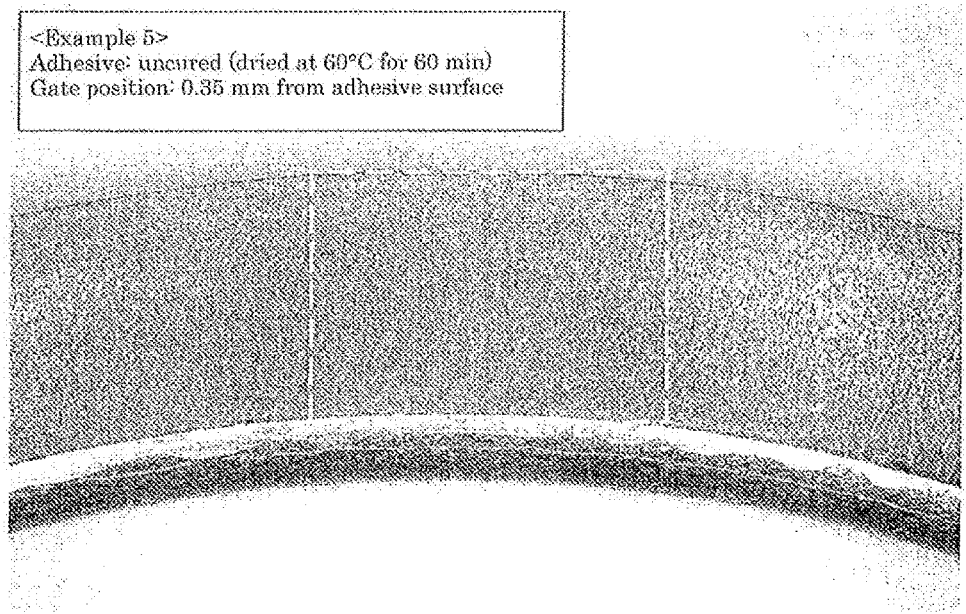
FIG. 8(a) is a photograph of an annular plastic magnet surface of a magnetic encoder in the example 5 molded by the molding die structure illustrated in FIG. 3(a)
Figure 8B:
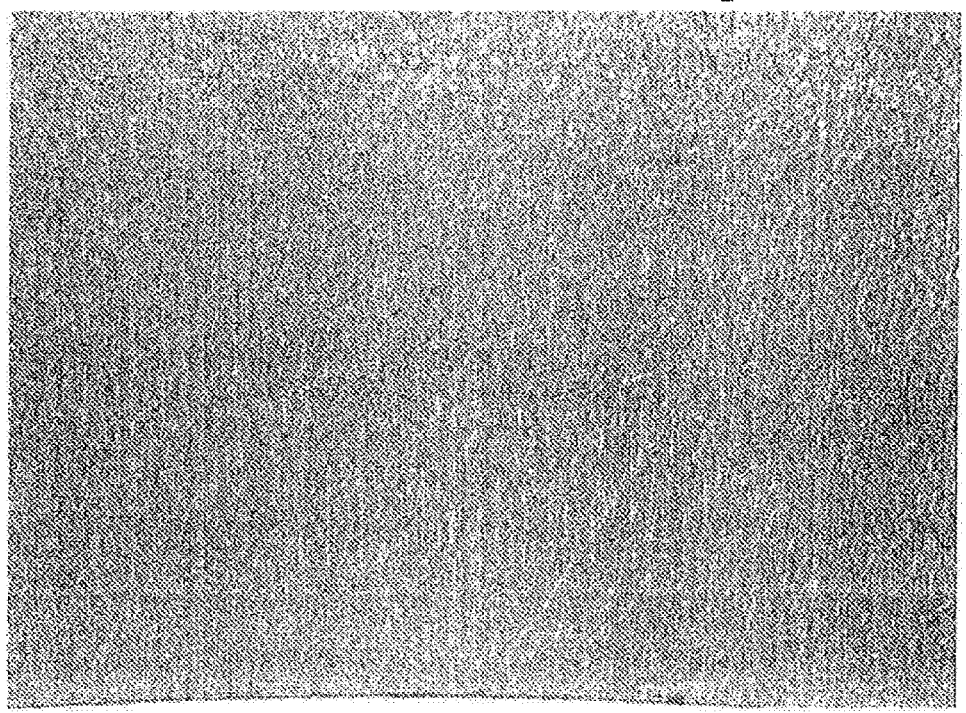
FIG. 8(b) is an enlarged photograph of the part surrounded by a broken line in FIG. 8(a)
Figure 9A:
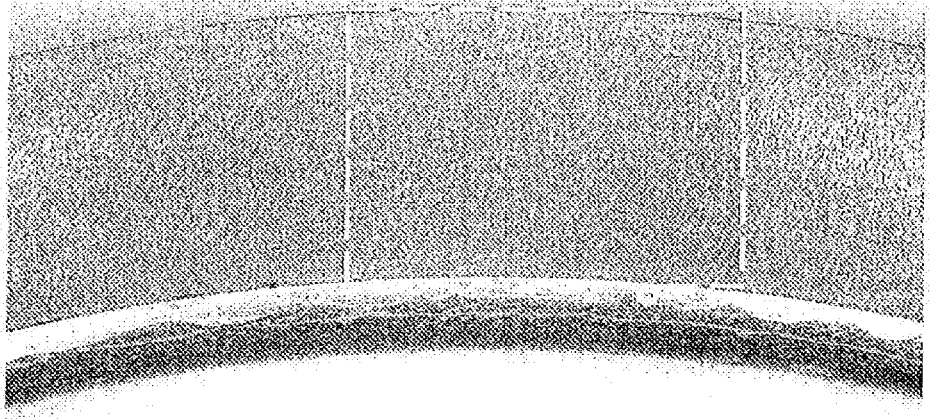
FIG. 9(a) is a photograph of an annular plastic magnet surface of a magnetic encoder in the example 6 molded by the molding die structure illustrated in FIG. 3(a)
Figure 9B:
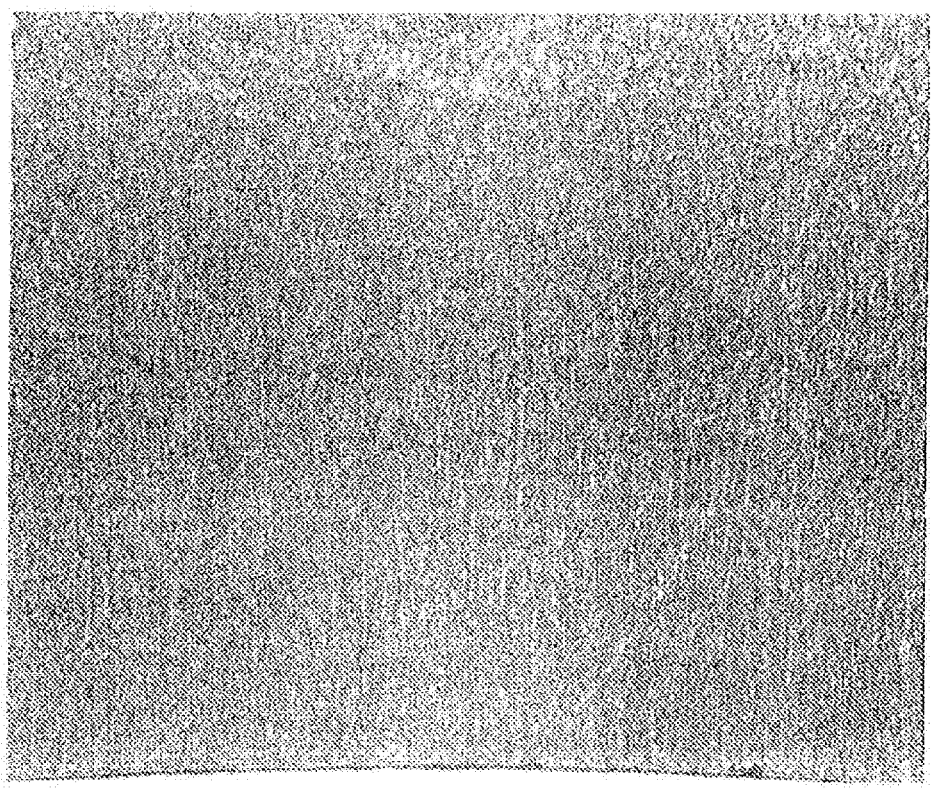
FIG. 9(b) is an enlarged photograph of the part surrounded by a broken line in FIG. 9(a)

In contrast, in the examples 4 to 7 molded by the molding die structure illustrated in FIG. 3(a) with the out-of-plane direction distance D of 0.2 mm or more from the adhesive surface A1 to the gate G, the adhesive did not appear on the surface of the plastic magnet (see the photographs of the surface of the annular plastic magnet of the magnetic encoder in FIGS. 7(a) and 7(b) corresponding to the example 4, FIGS. 8(a) and 8(b) corresponding to the example 5, and FIGS. 9(a) and 9(b) corresponding to the example 6).

The magnetic encoders of the examples 4 to 7 were cut in a radial direction vertical to the surface of the annular part 12B of the annular fixing member 12 (see FIG. 2(b)), and their cross sections were observed by an electron microscope. The observation has revealed that the adhesive near the gate (see the portion I of the thermoset resin adhesive layer 14 near the gate illustrated in FIG. 2(b)) remained without being flown out.

TABLE 2

| Examples/<br>Comparative examples | Example 4 | Example 5 | Example 6 | Example 7 | Comparative<br>Example 3 | Comparative<br>Example 4 |
|---|---|---|---|---|---|---|
| Molding die structure | | FIG. 3(a) | | | | FIG. 5 |
| Gate position | | Separation from adhesive surface in<br>out-of-plane direction | | | | On joining surface |

TABLE 2-continued

| Examples/Comparative examples | Example 4 | Example 5 | Example 6 | Example 7 | Comparative Example 3 | Comparative Example 4 |
|---|---|---|---|---|---|---|
| Out-of-plane distance D from adhesive surface to gate (mm) | 0.25 | 0.35 | 0.45 | 0.35 | — | — |
| Drying conditions of adhesive | 60° C. × 60 min | | | 100° C. × 30 min | 60° C. × 60 min | 100° C. × 30 min |
| Appearance of adhesive on plastic magnet surface | Absent (FIGS. 7(a) and 7(b)) | Absent (FIGS. 8(a) and 8(b)) | Absent (FIGS. 9(a) and 9(b)) | Absent | Present (FIGS. 10(a) and 10(b)) | Present |

With the molding die structure of FIG. 5, the adhesive was flown out only near the gate but was not flown out at the parts separated from the gate. This is because the molten resin flows normally (fountain flow) during injection molding at a position separated to some degree from the gate part where the flow velocity is high (for example, see FIG. 13(*a*), J), the flow velocity of the molten resin near the adhesive surface at a position separated to some degree from the gate part becomes lower, the shear velocity of the molten resin also becomes lower, and the wall surface shear stress generated near the adhesive surface becomes smaller. As a matter of course, also with the molding die structure illustrated in FIG. 3(*a*), the molten resin flows normally (fountain flow) during injection molding at a position separated to some degree from the gate part (for example, see FIG. 13(*b*), K).

<Comparison Test of Separation Strength>

Dumbbell test specimen was fabricated to conduct evaluation test of adhesion strength.

Figure 11:
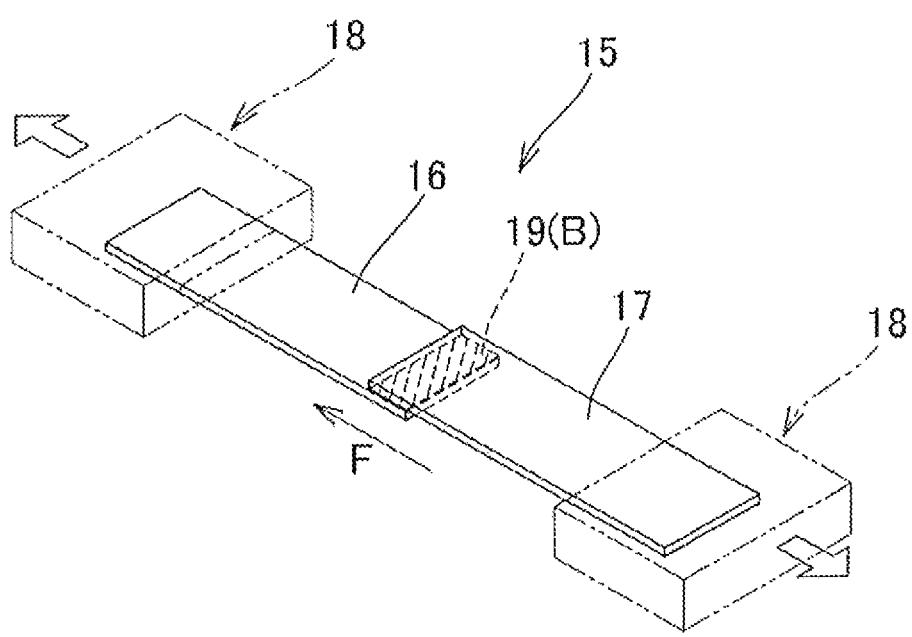
FIG. 11 is a schematic perspective view of a dumbbell test specimen for adhesion strength evaluation that was produced at separation strength comparison testing such that a thermoset resin adhesive was subjected to thermal curing process at a cross-linking reaction start temperature (150°

First, a SUS430 metal plate for the fixing member was processed to fabricate a fixing member plate 16 (25 mm wide, 80 mm long, and 2 mm thick) illustrated in the schematic perspective view of FIG. 11.

Next, a phenol-based thermoset resin adhesive B was applied to the surface of the fixing member plate 16 on one side, with a width of about 10 mm relative to a longitudinal direction F.

Next, the fixing member plate 16 was placed and left at rest in a reaction container at temperatures of 25° C., 60° C., 90° C., 105° C., 120° C., and 150° C. for 30 or 60 minutes to dry and remove completely an organic solvent (methyl ethyl ketone, methyl isobutyl ketone, or methanol) in the adhesive B, thereby forming the thermoset resin adhesive layer 19.

Next, the fixing member plate 16 was set in a predetermined insert molding die, and a molten plastic magnet material (raw ingredient: PA12+strontium ferrite powder) at 270° C. was injected into the molding die to mold a plastic magnet plate 17 almost the same in shape as the fixing member plate 16 illustrated in FIG. 11.

Next, the plastic magnet plate 17 was subjected to thermal curing treatment at 150° C. which is higher than the cross-linking start temperature to cause the cross-linking reaction and curing reaction of the thermoset resin adhesive layer 19, thereby obtaining an adhesion strength evaluation dumbbell test specimen 15 illustrated in FIG. 11. No magnetization took place.

The obtained adhesion strength evaluation dumbbell test specimen 15 was subjected to tension shear testing by a precision universal tester 18 at which the specimen was tensioned in the directions of the both ends under JISK6850 test conditions to inspect the force by which the thermoset resin adhesive layer 19 was broken, and measure the separation strength. FIG. 12 shows the test results in which the horizontal axis indicates the drying temperature (° C.) and the vertical axis indicates the separation strength (solid lines) and the separation strength deviation (two-dot chain line).

In FIG. 12, the separation strengths were shown with respect to a score of 100 representing the value of separation strength at a drying temperature of 120° C. and for a drying time of 30 minutes. In FIG. 12, the separation strength deviations are fluctuations (deviations) in the separation strength resulting from the difference in the drying time (60 minutes and 30 minutes).

The step of fabricating the adhesion strength evaluation dumbbell test specimen 15 conforms to the embodiment of manufacturing method of the insert molded article described above. Accordingly, the obtained separation strength is considered to be equivalent to the separation strength of the insert molded article (the magnetic encoder 11) fabricated in the same way.

It can be seen from the results shown in FIG. 12 that the separation strength started to become lower when the drying temperature exceeded about 105° C., and decreased significantly at a drying temperature of 120° C. or so, and became zero at a drying temperature of 150° C.

The inventors of the present invention have examined the cause of the reduction in separation strength. The separation strength decreased until the adhesion was lost at a drying temperature of 150° C. Accordingly, the inventors have recognized that there was a possibility that, when the drying temperature became higher, the adhesive caused curing reaction and decreased the reaction groups, thereby failing to join with the thermoplastic resin as a raw material of the plastic magnet.

The inventors thus have dried the phenol-based thermoset resin adhesive B applied to the joining surface A0 of the annular fixing member 12 as illustrated in FIG. 2(*a*) under the temperature conditions: 1) air-drying at room temperature; 2) drying at 90° C. for 10 minutes; or 3) baking at 150° C. for 10 minutes, and inspected whether the adhesive B could be removed by a methyl ethyl ketone (MEK) solvent under each of the conditions. The adhesive B dissolves in the MEK solvent, but the adhesive B having caused cross-linking reaction and denatured due to thermal curing does not dissolve in the MEK solvent. Accordingly, whether the adhesive is thermally cured can be known by checking whether the adhesive B can be removed by the MEK solvent.

As a result, the adhesive B was removed by the MEK solvent in both of the injection molding die 1) air-dried specimen and the 2) 90° C.-dried specimen, whereas the adhesive B was not removed by the MEK solvent in the 3) 150° C.-processed specimen.

Accordingly, it can be considered that the cross-linking reaction has already occurred due to thermal curing in the 3) 150° C.-processed specimen. The processing time was short in the 3) 150° C.-processed specimen, and therefore it can be considered that the adhesive B was not fully cured but semi-cured.

From the foregoing findings, it is estimated that the phenomenon of reduction in separation strength at 105° C. or so was caused by thermal curing of the thermoset resin adhesive B applied to the surface of the annular fixing member 12.

In fact, as seen from the results shown in FIG. 12, the separation strengths of the magnetic encoder obtained by drying at 25 to 105° C. were about 1.7 to 1.9 times higher than those obtained by drying at 120° C. regardless of the processing time, and therefore the joint strength of the adhesive significantly improved.

In addition, in the case of drying at 25 to 105° C., the temperature environment became lower than the case of drying at a high temperature adjusted to 120° C. or the like, which produces the advantage of facilitating stable mass processing.

Further, it can be seen from the results of FIG. 12 that the separation strength deviation became larger at drying temperatures higher than 105° C., and the influence of the drying temperature on the change in strength became larger.

Specifically, the value of the deviation at the 120° C. processing was about five times higher than that at the 60° C. processing. This indicates that the cross-linking curing reaction became more active at higher temperatures, and the curing reaction state varied largely depending on the drying time.

That is, it is suggested that drying at a temperature as high as 120° C. could contribute to improvements in productivity such as shortening of the processing time, but it is difficult to control the drying temperature and the drying time, and it is inevitable that fluctuations in the adhesion strength among the products will increase due to the fluctuations in temperature in the drying device at the time of mass processing and the difference in timing between introduction into and removal from the drying device.

In contrast, when the adhesive is dried at a drying temperature lower than the temperature at which the thermoset resin adhesive B starts cross-linking reaction such as 25 to 105° C., the separation strength deviation becomes smaller to suppress significantly fluctuations in the adhesion strength among the products in mass-processed batches and fluctuations in the adhesion strength among the products in each of the batch.

The tension shear adhesion strengths of the adhesion strength evaluation dumbbell specimen at drying temperatures of 25 to 105° C. and for a drying time of 30 minutes were 8 to 11 N/mm$^2$.

Meanwhile, the tension shear adhesion strengths of the adhesion strength evaluation dumbbell specimen at drying temperatures of 120° C. and for a drying time of 30 minutes were generally less than 5 N/mm$^2$.

Accordingly, the magnetic encoder obtained by the manufacturing method of the present invention has been found to improve the adhesion strength more than the conventional ones.

REFERENCE SIGNS LIST

A0 Joining surface
A1 Adhesive surface
B Thermoset resin adhesive
C Cavity
D Out-of-plane distance from adhesive surface to gate
E Gate mark
F Longitudinal direction
G Inner disc gate (gate)
H Portion of adhesive applied to joining surface near gate
I Portion of thermoset resin adhesive layer near gate
J and K Position separated to some degree from gate part
P Molten plastic magnet material
PL Parting line
T Thickness
1 Injection molding die
2 Fixed die plate
3 Movable die plate
4 Sprue
5 Runner
6 Insert core
7 Slide core
8 Jig
11 Magnetic encoder (insert molded article)
12 Annular fixing member (insert)
12A Cylindrical part
12B Annular part
13 Annular plastic magnet (plastic)
14 Thermoset resin adhesive layer
15 Adhesion strength evaluation dumbbell test specimen
16 Fixing member plate
17 Plastic magnet plate
18 Precision universal tester
19 Thermoset resin adhesive layer

The invention claimed is:

1. A manufacturing method of an insert molded article in which an insert with a thermoset resin adhesive applied to a joining surface relative to a plastic is placed in an injection molding die for use in injection molding and a molten material for the plastic is injected from a gate of the injection molding die into a cavity of the molding die to manufacture an insert molded article, wherein
    the insert has an annular shape,
    the gate of the injection molding die is an inner disc gate,
    the gate of the injection molding die is arranged at a position separated by 0.2 mm or more in an out-of-plane direction from the surface of the adhesive applied to the joining surface of the insert, the manufacturing method comprising:
    an adhesive application step of applying the adhesive to a surface of the insert including the joining surface;
    a natural drying step of volatilizing a solvent contained in the adhesive by natural drying or a drying and solidification step of volatilizing the solvent contained in the adhesive to dry and solidify the adhesive under temperature conditions lower than the temperature at which the adhesive starts cross-linking reaction; and
    an injection molding step of placing the insert having undergone the natural drying step or the drying and solidification step in the molding die and injecting the molten material for the plastic from the gate, which is arranged at the position separated by 0.2 mm or more in the out-of-plane direction from the surface of the adhesive applied to the joining surface of the insert, into the cavity of the molding die.

2. The manufacturing method of an insert molded article according to claim 1,
    wherein the insert molded article is a magnetic encoder for use in a bearing device for automobile wheel support, the insert is an annular fixing member attachable to a rotating body, and the plastic is an annular plastic magnet.

3. A manufacturing method of an insert molded article in which an insert with a thermoset resin adhesive applied to a joining surface relative to a plastic is placed in an injection molding die for use in injection molding and a molten material for the plastic is injected from a gate of the injection molding die into a cavity of the molding die to manufacture an insert molded article, wherein the insert has an annular shape, the gate of the injection molding die is an inner disc gate, the gate of the injection molding die is arranged at a position separated by 0.2 mm or more in an out-of-plane direction from the surface of the adhesive applied to the joining surface of the insert, and the molding die has an insert core-type molding die structure or a slide core-type molding die structure, the manufacturing method comprising:

an adhesive application step of applying the adhesive to a surface of the insert including the joining surface;

a natural drying step of volatilizing a solvent contained in the adhesive by natural drying or a drying and solidification step of volatilizing the solvent contained in the adhesive to dry and solidify the adhesive under temperature conditions lower than the temperature which the adhesive starts cross-linking reaction; and an injection molding step of placing the insert having undergone the natural drying step or the drying and solidification step in the molding die and injecting the molten material for the plastic from the gate, which is arranged at the position separated by 0.2 mm or more in the out-of-plane direction from the surface of the adhesive applied to the joining surface of the insert, into the cavity of the molding die.

4. The manufacturing method of an insert molded article according to claim 3, wherein the insert molded article is a magnetic encoder for use in a bearing device for automobile wheel support, the insert is an annular fixing member attachable to a rotating body, and the plastic is an annular plastic magnet.

* * * * *